US012198058B2

(12) United States Patent
Speranzon et al.

(10) Patent No.: US 12,198,058 B2
(45) Date of Patent: Jan. 14, 2025

(54) TIGHTLY COUPLED END-TO-END MULTI-SENSOR FUSION WITH INTEGRATED COMPENSATION

(71) Applicant: Honeywell International Inc., Charlotte, NC (US)

(72) Inventors: Alberto Speranzon, Maple Grove, MN (US); Andrew Stewart, Chanhassen, MN (US); Shashank Shivkumar, St. Louis Park, MN (US)

(73) Assignee: Honeywell International Inc., Charlotte, NC (US)

( * ) Notice: Subject to any disclaimer, the term of this patent is extended or adjusted under 35 U.S.C. 154(b) by 934 days.

(21) Appl. No.: 17/240,710

(22) Filed: Apr. 26, 2021

(65) Prior Publication Data
US 2022/0358365 A1    Nov. 10, 2022

(51) Int. Cl.
*G06N 3/084*    (2023.01)
*G01C 19/5776*    (2012.01)
(Continued)

(52) U.S. Cl.
CPC ......... *G06N 3/084* (2013.01); *G01C 19/5776* (2013.01); *G01C 21/16* (2013.01); *G06N 3/0499* (2023.01)

(58) Field of Classification Search
CPC ........ G06N 3/084; G06N 3/0499; G06N 3/08; G06N 3/04; G06N 3/063; G01C 19/5776; G01C 21/16
See application file for complete search history.

(56) References Cited

U.S. PATENT DOCUMENTS

| 5,554,273 A | 9/1996 | Demmin et al. |
| 9,665,100 B2 | 5/2017 | Shashua et al. |
(Continued)

FOREIGN PATENT DOCUMENTS

| CN | 101158588 A | 4/2008 |
| CN | 107148553 A | 9/2017 |
(Continued)

OTHER PUBLICATIONS

Jamil F, Iqbal N, Ahmad S, Kim DH. "Toward Accurate Position Estimation Using Learning to Prediction Algorithm in Indoor Navigation". Sensors (Basel). Aug. 7, 2020 (Year: 2020).*
(Continued)

*Primary Examiner* — Kamran Afshar
*Assistant Examiner* — Brian J Hales
(74) *Attorney, Agent, or Firm* — Fogg & Powers LLC (57) ABSTRACT

Systems and methods for a tightly coupled end-to-end multi-sensor fusion with integrated compensation are described herein. For example, a system includes an inertial measurement unit that produces inertial measurements. Additionally, the system includes additional sensors that produce additional measurements. Further, the system includes one or more memory units. Moreover, the system includes one or more processors configured to receive the inertial measurements and the additional measurements. Additionally, the one or more processors are configured to compensate the inertial measurements with a compensation model stored on the one or more memory units. Also, the one or more processors are configured to fuse the inertial measurements with the additional measurements using a differential filter that applies filter coefficients stored on the one or more memory units. Further, the compensation model and the filter coefficients are stored on the one or more memory (Continued)

units as produced by execution of a machine learning algorithm.

20 Claims, 4 Drawing Sheets (51) Int. Cl.
*G01C 21/16* (2006.01)
*G06N 3/0499* (2023.01)

(56) References Cited

U.S. PATENT DOCUMENTS

| | | | |
|---|---|---|---|
| 10,611,371 B2 | 4/2020 | Kusano et al. | |
| 2005/0251328 A1* | 11/2005 | Merwe | G01C 21/165 701/472 |
| 2010/0283832 A1 | 11/2010 | Lin | |
| 2017/0132334 A1 | 5/2017 | Levinson et al. | |
| 2018/0032871 A1* | 2/2018 | Holt | G06N 3/084 |
| 2018/0053056 A1 | 2/2018 | Rabinovich et al. | |
| 2018/0096259 A1 | 4/2018 | Andrews et al. | |
| 2018/0137642 A1 | 5/2018 | Malisiewicz et al. | |
| 2018/0180420 A1 | 6/2018 | Korenberg | |
| 2019/0056231 A1 | 2/2019 | Bai et al. | |
| 2019/0079536 A1 | 3/2019 | Zhu et al. | |
| 2019/0135616 A1 | 5/2019 | Aggarwal et al. | |
| 2019/0139205 A1 | 5/2019 | El-Khamy et al. | |
| 2019/0265703 A1 | 8/2019 | Hicok et al. | |
| 2019/0266418 A1 | 8/2019 | Xu et al. | |
| 2019/0298224 A1 | 10/2019 | Rahman et al. | |
| 2020/0160972 A1 | 5/2020 | Bériault et al. | |
| 2020/0311514 A1 | 10/2020 | Speranzon et al. | |
| 2020/0355503 A1 | 11/2020 | Chen et al. | |

FOREIGN PATENT DOCUMENTS

| | | |
|---|---|---|
| CN | 107290801 A | 10/2017 |
| CN | 107655472 A | 2/2018 |
| CN | 109188026 A | 1/2019 |
| CN | 110749337 A | 2/2020 |
| WO | 0073815 A1 | 12/2000 |
| WO | 2022013683 A1 | 1/2022 |

OTHER PUBLICATIONS

Bancroft JB, Lachapelle G. "Data fusion algorithms for multiple inertial measurement units". Sensors (Basel). Jun. 29, 2011 (Year: 2011).*
U.S. Patent and Trademark Office, "Notice of Allowance", U.S. Appl. No. 16/371,868, Aug. 20, 2021, pp. 1 through 14, Published: US.
European Patent Office, "Extended European Search Report from EP Application No. 20166033.9", from Foreign Counterpart to U.S. Appl. No. 16/371,868, Sep. 3, 2020, pp. 1 through 8, Published: EP.
Haarnajoa, "Backprop KF: Learning Discriminative Deterministic State Estimators", 30th Conference on Neural Information Processing Systems (NIPS 2016), pp. 1 through 9, Barcelona, Spain.
Jonschkowski et al., "Differentiable Particle Filters: End-to-End Learning with Algorithmic Priors", May 30, 2018, pp. 1 through 9.
Lee et al., "Multimodal Sensor Fusion with Differentiable Filters", Dec. 23, 2020, pp. 1 through 8.
Siddakatte et al., "Sensor Auto-Calibration Using Neural Networks for RISS Mechanization During Loss GNSS Outages", 6th ESA International Colloquium on Scientific and Fundamental Aspects of the Galileo, Oct. 25-27, pp. 1-8, Valencia, Spain.
U.S. Patent and Trademark Office, "Office Action", U.S. Appl. No. 16/371,868, Apr. 16, 2021, pp. 1 through 14, Published: US.
U.S. Patent and Trademark Office, "Office Action", U.S. Appl. No. 16/371,868, Oct. 7, 2020, pp. 1 through 23, Published: US.
Intellectual Property Office Great Britain, "Search Report under Section 17(5)", from GB Application No. GB2205658.4, from Foreign Counterpart to U.S. Appl. No. 17/240,710, pp. 1 through 3, Published: GB.
Israel Patent Office, "Office Action" from IL Application No. 273073 from Foreign Counterpart to U.S. Appl. No. 16/371,868, Sep. 11, 2022, pp. 1 through 6, Published: IL.
Israel Patent Office, "Notice of Deficiencies for Patent Application 291889", dated May 28, 2024 from IL Application No. 291889, from Foreign Counterpart to U.S. Appl. No. 16/370,868, pp. 1 through 5, Published: IL.

* cited by examiner

TIGHTLY COUPLED END-TO-END MULTI-SENSOR FUSION WITH INTEGRATED COMPENSATION

BACKGROUND

Many vehicles use inertial navigation systems to describe the motion of the vehicle. For example, vehicles that use inertial navigation systems include aircraft, unmanned aerial vehicles (UAVs), spacecraft, satellites, waterborne craft, guided missiles, guided munitions, and the like. The inertial navigation systems use inertial measurement units (IMUs) as principal components that measure the motion of the associated vehicle. Typically, IMUs use a combination of motion sensors, such as accelerometers and gyroscopes, to sense and report the specific force and angular rates for the associated vehicle.

Frequently, the inertial navigation system is part of a more extensive navigation system. The navigation system uses the measurements from the IMUs with measurements from other sensors to obtain a navigation solution for the vehicle. Frequently, the navigation system performs a fusion operation to combine the measurements from the different sensors to obtain the navigation solution for the vehicle. The navigation solution generally describes the position, velocity, and attitude of the vehicle with respect to a reference frame.

SUMMARY

Systems and methods for a tightly coupled end-to-end multi-sensor fusion with integrated compensation are described herein. For example, a system includes an inertial measurement unit that produces inertial measurements. Additionally, the system includes one or more additional sensors that produce one or more additional measurements. Further, the system includes one or more memory units. Moreover, the system includes one or more processors configured to receive the inertial measurements and the one or more additional measurements. Additionally, the one or more processors are configured to compensate the inertial measurements with a compensation model stored on the one or more memory units. Also, the one or more processors are configured to fuse the inertial measurements with the one or more additional measurements using a differential filter that applies filter coefficients stored on the one or more memory units. Further, the compensation model and the filter coefficients are stored on the one or more memory units as produced by execution of a machine learning algorithm.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Under common practice, the various described features are not drawn to scale but are drawn to emphasize specific features relevant to the example embodiments.

DETAILED DESCRIPTION

In the following detailed description, reference is made to the accompanying drawings that form a part of the present description, and in which is shown, through illustration, specific illustrative embodiments. However, it is to be understood that other embodiments may be used and that logical, mechanical, and electrical changes may be made.

The present disclosure describes systems and methods for tightly coupled end-to-end multi-sensor fusion with integrated compensation. In particular, embodiments described herein define a framework for the compensation of sensor measurements. Frequently, inertial sensors produce sensor measurements that are compensated. Machine learning algorithms are used to directly compensate the acceleration and gyroscope measurements from an IMU using navigation ground truth, which may include outputs such as position, velocity, and attitude. Additionally, the available ground truth calibrated IMU measurements may be used to fine tune the compensation model for the IMU sensor measurements. Further, a differentiable filter may fuse measurements from multiple sensors (including the IMU sensors) to allow compatibility with conventional optimization methods used with machine learning algorithms. The machine learning algorithms approximate highly complex, non-linear functions and can capture data relationships that are difficult to derive manually. By capturing the complex data relationships, the models developed using the machine learning algorithms can more accurately fuse data and compensate errors in the measurements provided by the various sensors in a navigation system.

After fabrication, IMUs are calibrated to increase the accuracy of the measurements provided by the IMUs. During operation, the measurements provided by the IMU can be compensated based on the calibration. Also, throughout the operational lifecycle of the IMU, the IMU may be exposed to changes in temperature, air pressure, humidity, and other environmental factors that could cause the IMU operation to change along with operational changes that occur as the IMU ages. Accordingly, the IMU may be periodically recalibrated to compensate for the changes that occur throughout the IMU life cycle.

Typically, IMUs are calibrated using various combinations of least squares or polynomial fitting. However, the proper use of traditional calibration techniques calls for a suitable understanding of the physics of the sensors and how the sensors respond to changes in environmental conditions, such as temperature and pressure, to provide accurate and reliable IMU compensation. For example, the (Rate) Table Calibration (TCAL) process is an existing IMU sensor compensation technique. Rate tables are mechanical tables utilized to test and calibrate gyroscope and accelerometer sensors for IMUs and other inertial guidance systems. The TCAL process utilizes the following parametric model for an IMU:

$$x_{comp} = C \cdot (sf \cdot x_{raw} + \text{bias}) \qquad (1)$$

where $x_{raw}$ represents either raw acceleration data (e.g., from an accelerometer) or raw angular rate data (e.g., from a gyroscope). The parameter $C \in \mathbb{R}^{3 \times 3}$ represents the (e.g., three-dimensional) misalignment matrix, whose entries, $C_{ij}$, represent the misalignment between the ith and jth axis. The scale factor in Equation (1) can be represented in matrix form as:

$$sf = \left(I + \begin{bmatrix} sf_x & 0 & 0 \\ 0 & sf_y & 0 \\ 0 & 0 & sf_z \end{bmatrix}\right) \in \mathbb{R}^{3\times 3} \quad (2)$$

where the scale factor parameter in Equation (1) is split over the different axis, yielding Equation (2). As indicated above, the TCAL method utilizes a least-squares regression algorithm to find the optimal parameter values by minimizing the sum of the squared residuals resulting from differences in the observed (raw) data and the anticipated data based on a model. However, as discussed above, the TCAL IMU compensation technique requires the user to suitably comprehend the physical characteristics of the sensors (e.g., gyroscopes and accelerometers) being utilized and also how the existing environmental conditions (e.g., air temperature and pressure) affect the operation of the sensors and the accuracy and reliability of the involved IMU sensor compensation process.

In certain embodiments, machine learning may be used to model highly complex and unstructured data. Some machine learning algorithms use large amounts of data to train the data-driven models produced by the machine learning algorithms. Accordingly, algorithms create data-driven models for navigation sensor operation using annotated raw and ground truth datasets for the modeled sensors. For IMU compensation, datasets used for creating data-driven models consist of raw IMU data and ground truth accelerations and angular rates from a rate table or a higher grade IMU, possibly with other test signals.

IMUs can be directly compensated from navigation data while simultaneously improving the operation of a filter for combining measurements from multiple sensors. Advantageously, directly compensating from navigation data while improving the operation of a filter simplifies the setup for collecting the data for training the data-driven model. The resultant data-driven model targets the final use case for providing accurate navigation estimates from a navigation system. Additionally, this would achieve tight coupling between the IMU and other sensors and simultaneously remove the need to model the uncertainty from each sensor individually.

In certain embodiments, machine learning algorithms may be trained using a backpropagation algorithm, which computes a gradient. For example, for a single input-output example of a neural network, a backpropagation algorithm may calculate a gradient of a loss function for the weights of the neural network. When backpropagation algorithms are used, the filters used to fuse the measurements from the various sensors may be differentiable. Accordingly, the errors between the predicted navigation estimates and the truth data can be used to improve the performance of the data-driven model. The machine-learning algorithm uses a combination of ground truth navigation and IMU measurements to improve the performance of the IMU compensation and the filter.

Figure 1:
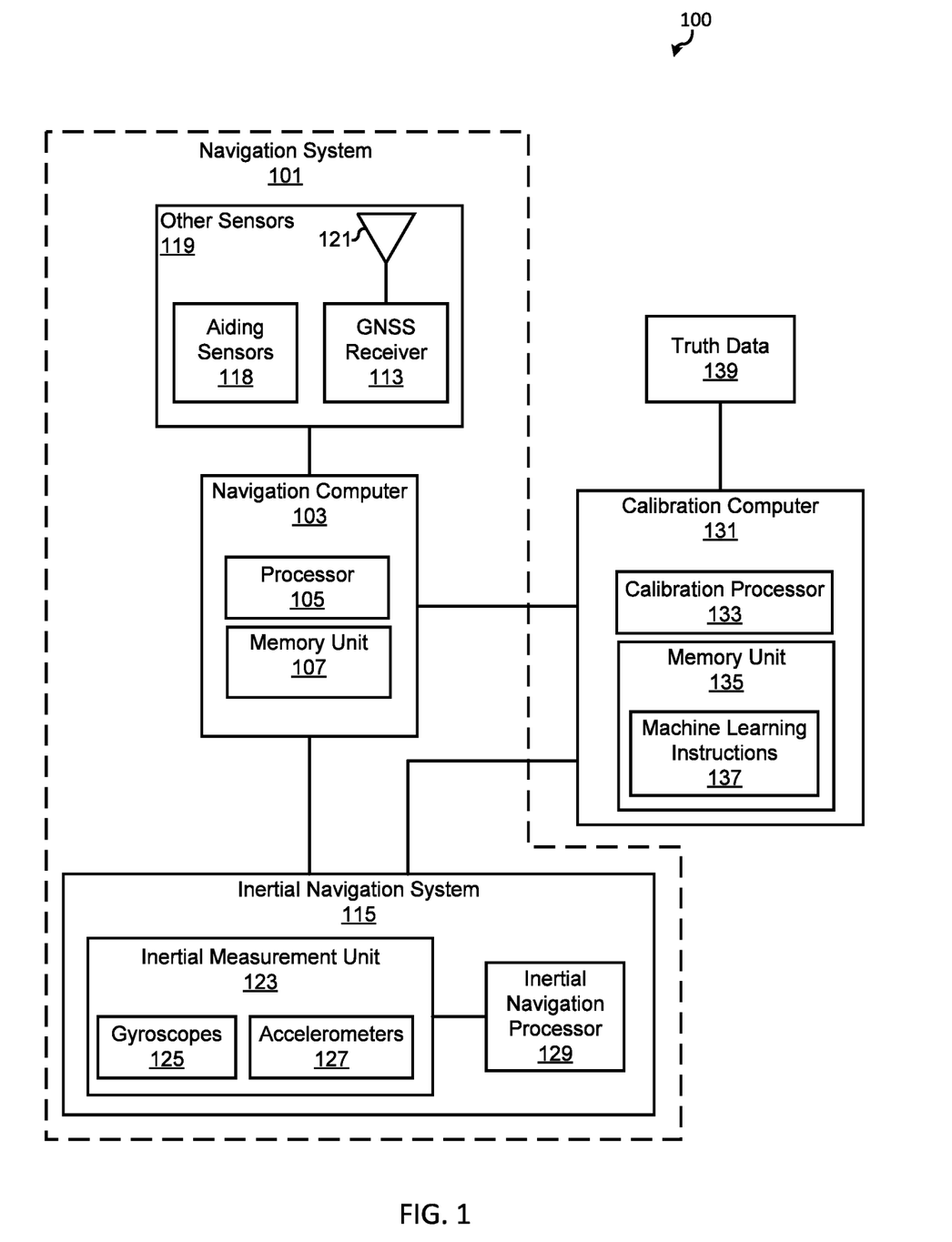
FIG. 1 is a schematic block diagram depicting a navigation system that can be utilized to implement one example embodiment of the present invention.

FIG. 1 is a block diagram of a system 100 that uses machine learning to compensate errors from an inertial navigation system 115 and perform sensor fusion for multiple sensors in a navigation system 101. The navigation system 101 may be mounted to a vehicle, such as an aircraft, sea craft, spacecraft, automobile, or other vehicle type. Alternatively, the navigation system 101 may be located on or as part of an object capable of being moved from one location to another. Additionally, the navigation system 101 may acquire navigation information from one or more different sources. To handle the acquired navigation information, the navigation system 101 may include a navigation computer 103. The navigation computer 103 may further include at least one processor 105 and at least one memory unit 107.

In certain embodiments, the navigation system 101 may acquire navigation information that includes inertial motion information from the inertial navigation system 115. To acquire the inertial motion information, the inertial navigation system 115 may include an inertial navigation system 115 that measures and senses inertial motion of the object associated with the inertial navigation system 115. Additionally, the inertial navigation system 115 provides inertial measurements (such as an inertial navigation solution or raw inertial measurements) as an output. For example, the inertial navigation system 115 may include an IMU 123 that produces raw inertial data from a combination of inertial sensors such as gyroscopes 125 and accelerometers 127 and process the raw inertial data to provide an inertial navigation solution.

In additional embodiments, the IMU 123 includes multiple gyroscopes 125 and multiple accelerometers 127. For example, in this embodiment, the gyroscopes 125 may include a 3-axis gyroscope that measures the angular velocity along the X, Y, and Z axes of the IMU 123. Also, the accelerometers 127 may include a 3-axis accelerometer that measures the acceleration or rate of change of the velocity along the X, Y, and Z axes of the IMU 123. In additional implementations, the IMU 123 includes other sensors (not shown). For example, the other sensors can be non-motion sensors utilized to measure temperature changes, structural changes (e.g., strain gauges), changes in sensed magnetic fields (e.g., the magnetic field of the earth), and the like. Although the gyroscopes 125 and the accelerometers 127 are each described as measuring along three axes, both the gyroscopes and accelerometers can measure along three or fewer axes.

In exemplary embodiments, the output signals (e.g., raw data samples) from the gyroscopes 125, accelerometers 127, and other sensors within the inertial navigation system 115 are coupled to a processing device, like an inertial navigation processor 129. The inertial navigation processor 129 may process the raw signals from the sensors within the inertial navigation system 115 and calculate an inertial navigation solution.

In further embodiments, the navigation system 101 may include additional sensors that can provide additional measurements of navigation data. For example, the navigation system 101 may include one or more other sensors 119. The one or more other sensors 119 may include a series of aiding sensors 118. For example, the aiding sensors 118 may include a vertical position sensor such as an altimeter. Also, the aiding sensors 119 may include electro-optical sensors, magnetometers, barometric sensors, velocimeters, and/or other types of sensors.

In certain embodiments, the other sensors 119 may also acquire GNSS measurements as additional measurements to calculate navigation information. Accordingly, the other sensors 119 may include a GNSS receiver 113 with at least one antenna 121 that receives satellite signals from multiple GNSS satellites that are observable to the at least one antenna 121. For example, during operation, the GNSS receiver 113 receives GNSS satellite signals from the presently visible GNSS satellites. As used herein, the GNSS satellites may be any combination of satellites that provide navigation signals. For example, the GNSS satellites may be part of the global positioning system (GPS), GLONASS, Galileo system, COMPASS (BeiDou), or other satellite system that form part of a GNSS. The GNSS satellites may provide location information anywhere on the earth. The processor 105 and GNSS receiver 113 may receive the satellite signals and extract position, velocity, and time data from the signals to acquire pseudorange measurements.

In exemplary embodiments, the navigation computer 103 may receive the GNSS signals from the GNSS receiver 113, additional navigational measurements from the other sensors 119, and inertial navigation solution from the inertial navigation system 115. The processor 105 may act as an interface layer for fusing the measurements by executing a statistical filter, like a Kalman filter or other statistical filter. In certain embodiments, the filter is differentiable. The processor 105 uses the filter to generate a navigation solution for the object associated with the navigation system 101.

Also, the inertial navigation system 115 and the navigation computer 103 may provide the raw signals from the IMU 123 and the one or more other sensors 119, the inertial navigation solution from the inertial navigation system 115, the GNSS signals from the GNSS receiver 113, and/or the computed navigation solution from the navigation computer 103 to a calibration computer 131 through a suitable (e.g., analog or digital) communication link. The calibration computer 131 may connect to the navigation computer 103 and the inertial navigation system 115 during an initial calibration period. Also, the calibration computer 131 may connect to the navigation computer 103 and the inertial navigation system 115 during periodic recalibrations as determined by an operator, the navigation computer 103, or other computing system (not shown) in communication with the navigation computer 103 and/or the inertial navigation system 115.

In some embodiments, the calibration computer 131 includes a calibration processor 133 that executes machine learning instructions 137 stored on a memory unit 135. For example, the machine learning instructions 137 may instruct the calibration processor 133 to execute a machine learning algorithm. As described herein, a machine learning algorithm may be an algorithm that improves the performance of a computer when completing a task through experience with data. For example, the machine learning algorithm may be a deep learning algorithm, such as a deep neural network (DNN), or other type of machine learning algorithm.

In certain embodiments, the calibration computer 131 uses the raw inertial data provided by the inertial navigation system 115 as an input to the machine learning algorithm to generate an inertial compensation model. As used herein, an inertial compensation model may refer to a series of coefficients (or other types of data) that can be applied to the measurements provided by the IMU 123. For example, the calibration computer 131 may receive the raw inertial data in conjunction with truth data 139. As used herein, the truth data 139 may refer to data that more closely represents the actual navigation state of the object associated with the navigation system 101 than the measurements provided by the sensors within the navigation system 101. For example, concerning compensation for the IMU 123, the truth data 139 may include ground truth accelerations and angular rates (from either a rate table or higher grade IMU) and other test signals. Using the truth data 139, the calibration processor 133 executes the machine learning instructions 137 stored on the memory unit 135 to calculate compensation coefficients for the raw data provided by the IMU 123. In some embodiments, the use of machine learning to calculate compensation coefficients is described in greater detail in the United States patent application publication 2020/0311514, filed on Apr. 1, 2019, titled "DEEP NEURAL NETWORK-BASED INERTIAL MEASUREMENT UNIT (IMU) SENSOR COMPENSATION METHOD," which is incorporated herein by reference.

In further embodiments, the calibration computer 131 may use the raw inertial data from the inertial navigation system 115 in conjunction with the other measurements provided by the one or more other sensors 119 and GNSS receiver 113 to calculate filter coefficients for performance of the calibration for the sensor fusion. For example, the filter coefficients may define a weighted average between the predicted state of the system 100 and incoming sensor measurements, combinations of the inertial measurements and measurements of the measurements from the one or more other sensors 119. In particular, the navigation computer 103 may use a filter to fuse the measurements from the GNSS receiver 113, the inertial navigation system 115, and the one or more other sensors 119. The filter may produce an estimate as an average of the predicted state for the system and the various new measurements using a weighted average. In some embodiments, the filter is differentiable (such as an extended Kalman filter or other differentiable filter). The calibration computer 131 executes the machine learning instructions 137 to calculate the filter coefficients that fuse the measurements within the navigation computer 103.

In certain embodiments, the calibration computer 131 also uses the truth data 139 when calculating the filter coefficients for the sensor fusion. For example, in addition to the truth data 139 described above concerning the IMU 123, the truth data 139 also includes annotated raw and ground truth datasets for the one or more other sensors 119, publicly available datasets, and the like. In additional embodiments, the calibration computer 131 calculates the filter and compensation coefficients for the raw data from the IMU 123 during the same calibration procedure. By calculating both the compensation coefficients and filter coefficients simultaneously, the sensor fusion and inertial navigation solution compensation become tightly coupled to one another. Because of the tight coupling of the sensor fusion and the inertial compensation during calibration, the resultant navigation solution may have an increased accuracy during the operation of the navigation system 101.

The processor 105, inertial navigation processor 129, calibration processor 133, and/or other computational devices used in the navigation system 101, or other systems and methods described herein may be implemented using software, firmware, hardware, or appropriate combinations thereof. In some implementations, a single processor may execute the functionality of any combination of the processor 105, inertial navigation processor 129, and calibration processor 133. The processor 105, inertial navigation processor 129, calibration processor 133, and other computational devices may be supplemented by, or incorporated in, specially-designed application-specific integrated circuits (ASICs) or field programmable gate arrays (FPGAs). In some implementations, the processor 105, inertial navigation processor 129, calibration processor 133, and/or other computational devices may communicate through an additional transceiver with other computing devices outside of the navigation system 101, such as those associated with the management system 111 or computing devices associated with other subsystems controlled by the management system

111. The processor 105 and other computational devices can also include or function with software programs, firmware, or other computer-readable instructions for carrying out various process tasks, calculations, and control functions used in the methods and systems described herein.

In some embodiments, the functions of the processor 105, inertial navigation processor 129, and calibration processor 133 are performed by one or more processors. For example, the processor 105 receives the raw inertial data from the IMU 123 and calculates the inertial navigation solution or processes the raw IMU data for fusion with measurements from the one or more other sensors 119 and the GNSS receiver 113. Alternatively, the navigation processor 105 may perform the functionality ascribed above to the calibration processor 133. For example, the memory unit 107 stores the machine learning instructions 137 executed by the processor 105. When the processor 105 executes the machine learning instructions 137, the navigation system 101 may not be coupled to a calibration computer 131 to perform the calibration and compensation calculations. However, the navigation system 101 may receive commands from other computing systems to perform the calibration and compensation calculations.

The methods described herein may be implemented by computer-executable instructions, such as program modules or components, which are executed by at least one processor, such as the processor 105. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used to store computer-readable instructions or data structures. Such a computer-readable medium may be available media that can be accessed by a general-purpose or special-purpose computer or processor, or any programmable logic device. For instance, the memory unit 107 may be an example of a computer-readable medium capable of storing computer-readable instructions and/or data structures. The memory unit 107 may also store navigation information such as maps, terrain databases, magnetic field information, path data, and other navigation information. Additionally, the memory unit 107 may store the compensation model and the filter coefficients for application of the compensation model to the inertial measurements and the filter coefficients to a fusion of the inertial measurements with the one or more additional measurements during operation of an associated system.

Suitable computer-readable storage media (such as the memory unit 107 or the memory unit 135) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

Figure 2:
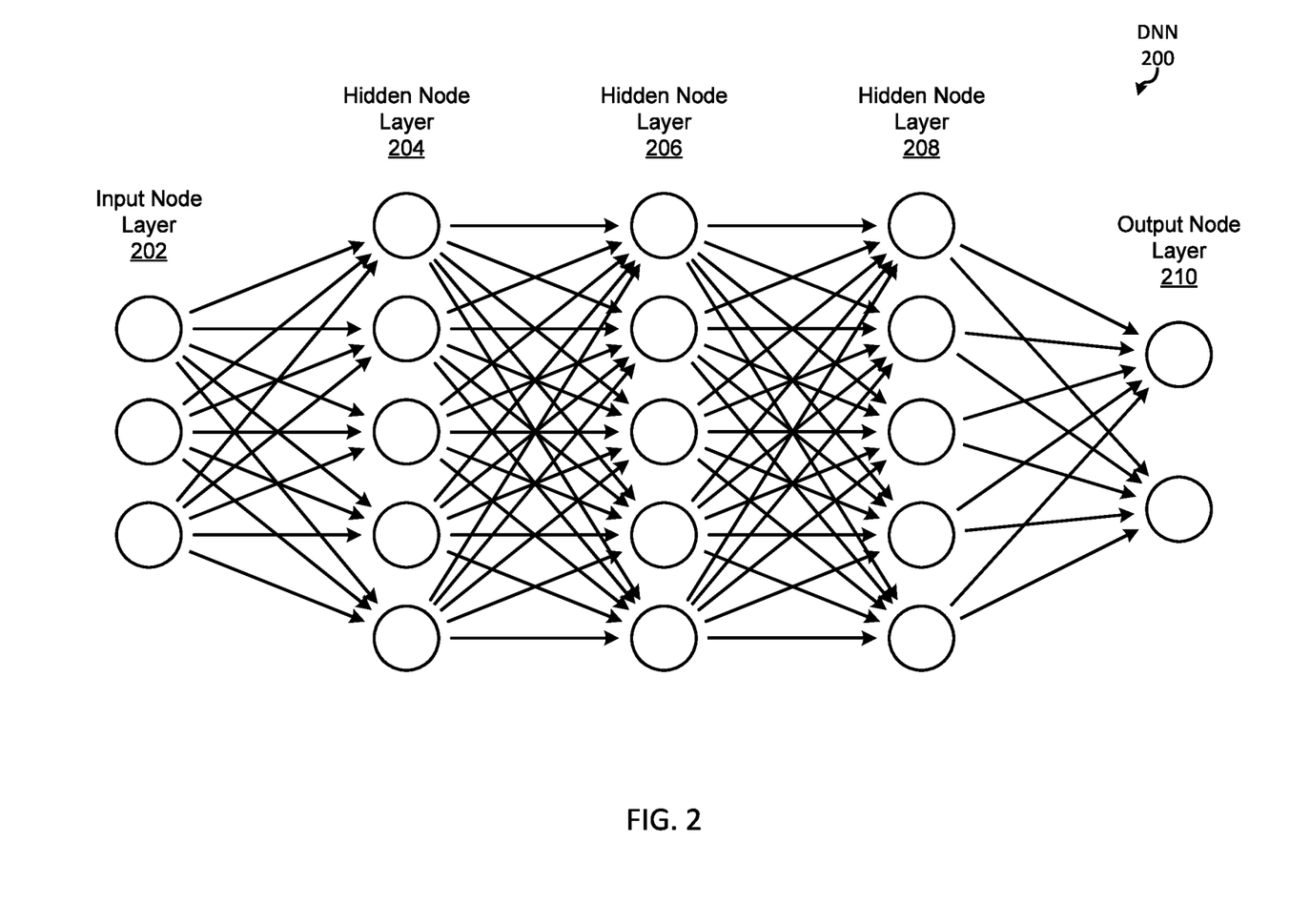
FIG. 2 is a schematic block diagram depicting a Deep Neural Network (DNN) that can be utilized to implement one example embodiment of the present invention.

FIG. 2 is a schematic block diagram depicting a DNN 200, which is an example of a machine learning algorithm that can be used to implement one example embodiment of the present invention. For this exemplary embodiment, the DNN 200 is implemented as a "stacked" neural network (e.g., network composed of numerous node layers). For example, the DNN 200 includes an input node layer 202, a plurality of hidden node layers 204, 206, 208, and an output node layer 210. Each node layer includes a plurality of nodes. Each node is a computational entity (e.g., loosely patterned on a neuron in the brain) that can be triggered to have "high activation" or "low activation" in response to an input. A node layer (e.g., 202, 204, 206, 208, or 210) is a row of these computational entities that can have "high activation" or "low activation" as an input signal is fed through the DNN 200. The output of each node layer is simultaneously the input to the subsequent node layer.

Notably, for this example embodiment, each node in the node layers 202, 204, 206, 208, and 210 combines the signal/data at its input with a respective set of coefficients or weights that either amplify or dampen the input signal/data. Consequently, each node in the node layers 202, 204, 206, 208, and 210 thereby assigns significance (e.g., weight) to its respective input concerning the task(s) the DNN algorithm is attempting to learn.

Notably, for this example embodiment, the DNN 200 is implemented as a learning algorithm. For example, during an exemplary learning process, the DNN 200 can be trained utilizing ground truth (e.g., labeled) data provided, for example, by one or more high quality, calibrated sensors (e.g., operating under similar conditions as those of the sensors providing the raw data), or data provided by an external truth system (e.g., calibrated rate table). For example, in one embodiment, the learning process for the DNN 200 can be accomplished by utilizing ground truth (e.g., labeled) data for 70% of the data being input to the DNN, and the compensation process for the DNN 200 can be accomplished by utilizing raw sensor data for the remaining 30% of the data being input to the DNN. However, in another embodiment, any suitable percentages other than 70% for the learning process and 30% for the compensation process can be utilized. In any event, for this example embodiment, the input-weighted products of the nodes in the node layers 202, 204, 206, 208, and 210 are summed, and the sum of these products is passed through the node's activation function to determine whether, and to what extent, that input data (e.g., raw sensor data) can progress further through the DNN to affect the outcome.

More precisely, referring again to FIG. 1, the DNN may be implemented through the machine learning instructions 137 as a function approximator that maps inputs to outputs by finding correlations between them. Notably, a DNN learns to approximate unknown functions such as, for example, the function f(x)=y, between any input x and any output y, if the input and output are related at all by any correlation. During the learning process, the DNN finds the correct manner of transforming the input "x" into the output "y". For example, referring to Equation (2), the input to the DNN can be represented in matrix form as $X = \mathbb{R}^n$, and the (e.g., approximate) output of the DNN can be represented in matrix form as $Y = \mathbb{R}^m$. As such, the approximated output, Y, of the DNN can be represented as:

$$Y \approx W_4(f_3(W_3(f_2(W_2(f_1(W_1 X + B_1) + B_2) + B_3) + B_4 \qquad (3)$$

where the parameter, $f_3$, represents the activation function, and the function $f_1(W_1 X + B_1)$ represents the function of the first column (e.g., layer) of nodes of the DNN having a weighted input $W_1 X$ and a bias $B_1$. Similarly, the parameter $f_2(W_2(f_1(W_1 X + B_1) + B_2)$ represents the function of the second column (e.g., layer) of nodes with the weight $W_2 X$ and bias $B_2$ added, and so on for the additional columns or layers. In other words, the output, Y, is an approximation of the sum of the weighted inputs, X, for all of the nodes in the DNN. As described earlier, the input-weight products are summed, and the sum of these products is passed through the node's activation function to determine whether, and to what extent, a particular input should progress further through the neural network to affect the outcome.

At this point, it is useful to note that, in a different embodiment, instead of utilizing a feedforward neural network (e.g., DNN) to compensate sensed input signals/data (e.g., X) at single time instances (e.g., as described above), a neural network that processes/compensates a continuum of the sensed input signals or data over a period of time could be utilized. For example, in other embodiments, recurrent neural networks (RNN), convolutional neural networks (CNN), residual networks (ResNets), or combinations of various network blocks could be utilized to compensate a continuum of sensor input signals or data received over a period of time.

In summary, referring again to FIG. 1, for the compensation of the raw data of the IMU 123, the raw sensor output signals from the IMU 123 can be represented as the weighted inputs, X, in Equation (3), and the compensated IMU signals produced by the calibration computer 131 can be represented as the output approximations, Y. As such, in accordance with the above-described teachings, a DNN-based methodology is provided herein to implement an IMU sensor compensation technique that is more accurate than non-machine learning IMU sensor compensation techniques. For example, users can implement IMU compensation without being required to understand the physical characteristics of the sensors or the environmental conditions under which they are being operated.

Similarly, referring again to FIG. 1, for the calculation of weights to be used by the sensor fusion performed by the navigation computer 103, the signals provided from the various sensors in the navigation system 101 (GNSS receiver 113, one or more other sensors 119, and inertial navigation system 115) can be represented as the weighted inputs X, in Equation (3), and the fused outputs of the differential filters can be represented as the output approximations Y. As such, in accordance with the above-described teachings, a DNN-based methodology is provided herein to implement a method for calculating the filter coefficients for sensor fusion that is more accurate and tightly coupled to the calibration of the IMU 123. Because the filter coefficients for sensor fusion and the compensation coefficients are calculated at the same time using machine-learning algorithms, the navigation system 101 may provide more accurate navigation solutions than other non-coupled systems.

Figure 3:
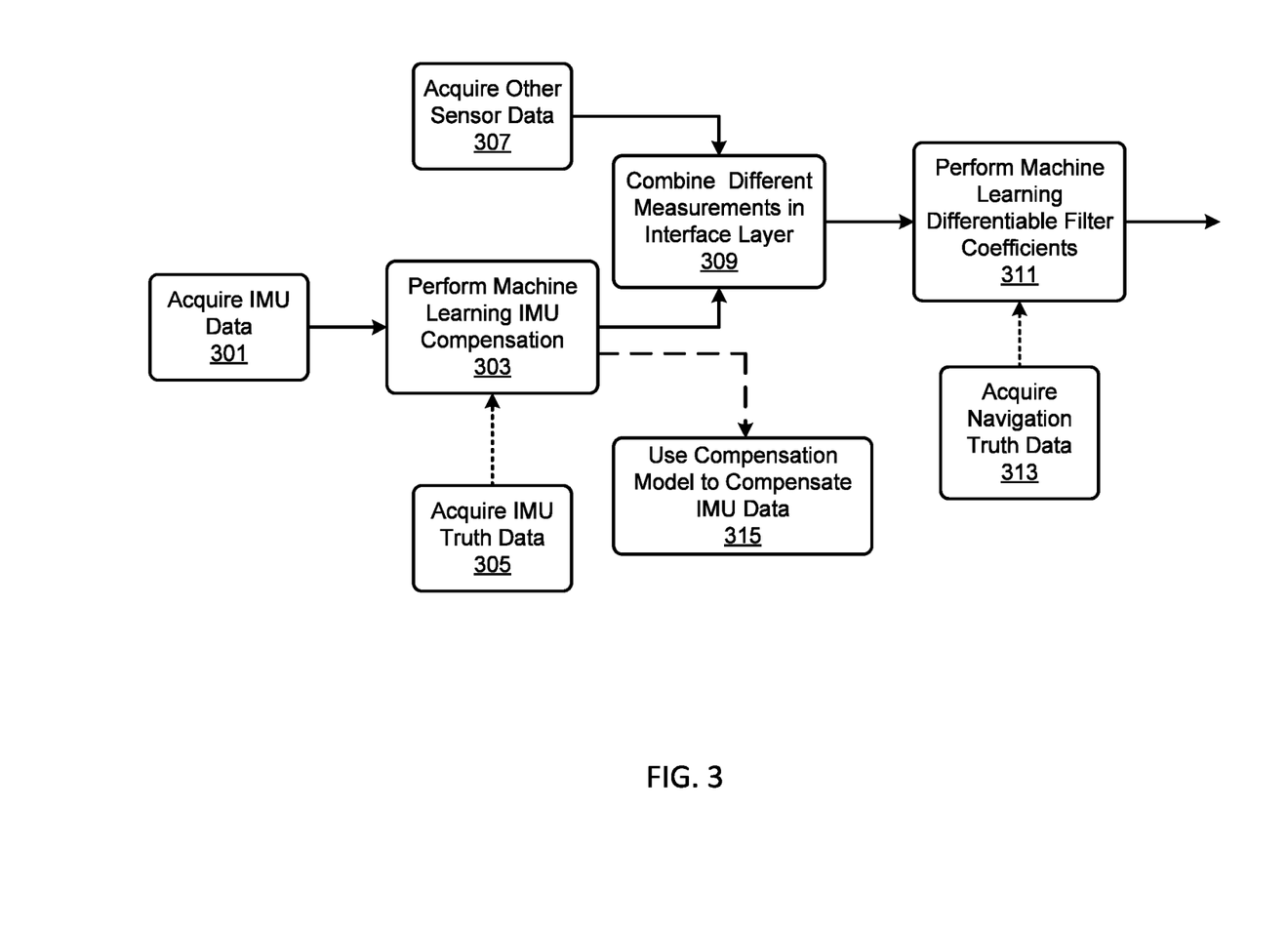
FIG. 3 is a flow diagram depicting a method that implements one example embodiment of the present invention.

FIG. 3 is a flowchart diagram of a method 300 illustrating the calibration process for a navigation system (such as the navigation system 101 in FIG. 1) that uses machine-learning to tightly couple the sensor fusion to IMU compensation. Referring to FIG. 1, the method 300 may be performed by the navigation computer 103, the calibration computer 131, other computing device, or any combination of the mentioned computers. As illustrated, the method 300 proceeds at 301, where IMU data is acquired. Referring to FIG. 1, the IMU 123 produces raw inertial data provided to the calibration computer 131 by the inertial navigation system 115.

The method 300 then proceeds at 303, where machine learning compensation is performed. Additionally, the method proceeds at 305, where the calibration computer 131 acquires IMU truth data. For example, the calibration computer 131 executes a machine learning algorithm that uses the raw IMU data and the IMU truth data. The IMU truth data is acquired as described above. When executing the machine learning algorithm, the calibration computer 131 may use a backpropagation algorithm as part of the machine learning algorithm. Using the truth data, the calibration computer 131 calculates compensation coefficients to compensate for the biases in the raw data produced by the IMU 123.

Further, the method proceeds at 307, where other sensor data 307 is acquired. For example, the one or more other sensors 119 and the GNSS receiver 113 may provide measurements to the navigation computer 103. Also, the method 300 proceeds at 309, where the different measurements are combined in an interface layer. As used herein, the interface layer refers to a connector or device that allows signals from multiple devices to be provided as an input to a single device. For example, the navigation computer 103 may connect to multiple devices that provide signals to the navigation computer 103. The navigation computer 103 may receive the measurements through a device that provides the measurements to the processor 105 for performing sensor fusion. In alternative embodiments, the interface layer executes a differential filter for performing sensor fusion.

Additionally, the method 300 proceeds at 311, where machine learning is performed to calculate differential filter weights. Further, the method 300 proceeds at 313, where navigation truth data is acquired. In certain embodiments, the calibration computer 131 executes a machine learning algorithm that uses the navigation truth data and the measurements from the various sensors as inputs. The navigation truth data is acquired as described above. When executing the machine learning algorithm, the calibration computer 131 may use a backpropagation algorithm as part of the machine learning algorithm. Using the navigation truth data, the calibration computer 131 calculates filtered outputs for use by the navigation computer 103 when performing sensor fusion for the measurements received from the navigation computer 103.

As described above, the machine learning algorithms calculate the filter coefficients for sensor fusion at the same time that a different or similar machine learning algorithm is calculating the compensation coefficients or values for the IMU data. Thus, as the compensation coefficients are applied to the IMU data, the filter coefficients for the sensor fusion adjust to the more accurate IMU data. Accordingly, when completed, the filter coefficients that result from the optimization of the machine learning algorithm are calculated based on the compensated IMU data. Thus, the filter coefficients are tightly coupled to the compensated IMU data. Due to the tight coupling of the compensated IMU data and the calibrated sensor fusion, the navigation system 101 may produce more accurate navigation solutions for an object associated with the navigation system 101.

In some embodiments, after executing the machine learning algorithm to generate the compensation model and the filter coefficients, the system operates without using the IMU truth data and the navigation truth data. For example, the IMU truth data and the navigation truth data are available for the execution of the machine learning algorithm. However, during normal operation, the resultant compensation model and filter coefficients are used to improve the operation. Additionally, in some alternative embodiments, the method 300 may proceed at 315, where the compensation model is used to compensate IMU data without the corresponding differentiable filter.

Figure 4:
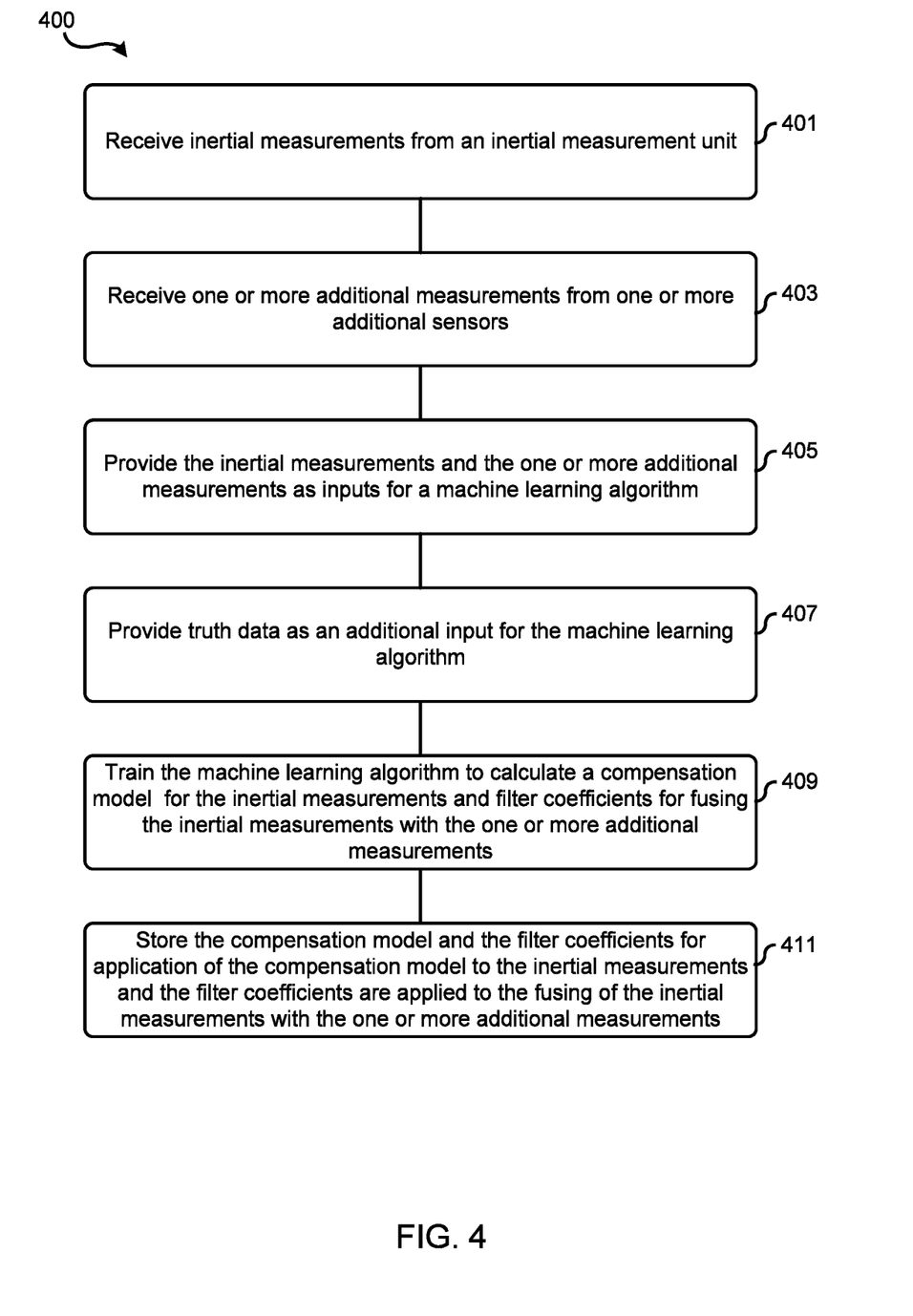
FIG. 4 is a flow diagram illustrating a method that can be utilized to implement one example embodiment of the present invention.

FIG. 4 is a flowchart diagram of a method 400 for performing tightly coupled end-to-end multi-sensor fusion with integrated compensation. The method 400 proceeds at 401, where inertial measurements are received from an inertial measurement unit. Additionally, the method 400 proceeds at 403, where one or more additional measurements are received from one or more additional sensors. Further, the method 400 proceeds at 405, where the inertial measurements and the one or more additional measurements are provided as inputs for a machine learning algorithm.

In certain embodiments, the method 400 proceeds at 407, where truth data is provided as an additional input for the machine learning algorithm. Moreover, the method 400 proceeds at 409, where the machine learning algorithm is trained to calculate a compensation model for the inertial measurements and filter coefficients for fusing the inertial measurements with the one or more additional measurements. Further, the method 400 proceeds at 411, where the compensation model and the filter coefficients are stored for application of the compensation model to the inertial measurements and the filter coefficients are applied to the fusing of the inertial measurements with the one or more additional measurements.

It should be understood that elements of the above-described embodiments and illustrative figures may be used in various combinations with each other to produce still further embodiments that are explicitly intended as within the scope of the present disclosure.

EXAMPLE EMBODIMENTS

Example 1 includes a method, comprising: receiving inertial measurements from an inertial measurement unit (IMU); receiving one or more additional measurements from one or more additional sensors; providing the inertial measurements and the one or more additional measurements as inputs for a machine learning algorithm; providing truth data as an additional input for the machine learning algorithm; training the machine learning algorithm to calculate a compensation model for the inertial measurements and filter coefficients for fusing the inertial measurements with the one or more additional measurements; and storing the compensation model and the filter coefficients for application of the compensation model to the inertial measurements and the filter coefficients to a fusion of the inertial measurements with the one or more additional measurements during operation of an associated system.

Example 2 includes the method of Example 1, wherein the machine learning algorithm is at least one of a feedforward neural network and a recurrent neural network.

Example 3 includes the method of any of Examples 1-2, wherein fusing the inertial measurements with the one or more additional measurements comprises using a statistical filter to fuse the inertial measurements with the one or more additional measurements.

Example 4 includes the method of Example 3, wherein the statistical filter is a differential filter.

Example 5 includes the method of any of Examples 3-4, wherein the filter coefficients describe combinations of the inertial measurements and the one or more additional measurements.

Example 6 includes the method of any of Examples 1-5, wherein the inertial measurements comprise at least one of a raw data sample from the IMU and an inertial navigation solution.

Example 7 includes the method of any of Examples 1-6, wherein the truth data comprises data having greater accuracy than the inertial measurements and the one or more additional measurements, the truth data being at least one of: ground truth accelerations; angular rates; annotated raw and ground truth datasets for the one or more additional sensors; and publicly available datasets.

Example 8 includes the method of any of Examples 1-7, wherein the machine learning algorithm includes a backpropagation algorithm.

Example 9 includes the method of any of Examples 1-8, wherein the compensation model comprises a series of compensation coefficients for the inertial measurements.

Example 10 includes the method of any of Examples 1-9, wherein the inertial measurements and the one or more additional measurements are provided as the inputs during at least one of: an initial calibration period; and a periodic calibration period.

Example 11 includes the method of any of Examples 1-10, wherein training the machine learning algorithm to calculate the compensation model and the filter coefficients are performed during a same procedure.

Example 12 includes a system, comprising: an inertial measurement unit that produces inertial measurements; one or more additional sensors that produce one or more additional measurements; one or more memory units; and one or more processors configured to receive the inertial measurements and the one or more additional measurements, wherein the one or more processors are configured to: compensate the inertial measurements with a compensation model stored on the one or more memory units; and fuse the inertial measurements with the one or more additional measurements using a differential filter that applies filter coefficients stored on the one or more memory units; wherein the compensation model and the filter coefficients are stored on the one or more memory units as produced by execution of a machine learning algorithm.

Example 13 includes the system of Example 12, wherein the machine learning algorithm is at least one of a feedforward neural network and a recurrent neural network.

Example 14 includes the system of any of Examples 12-13, wherein the filter coefficients of the differential filter are used to combine the inertial measurements and the one or more additional measurements.

Example 15 includes the system of any of Examples 12-14, wherein the inertial measurements comprise at least one of raw inertial measurement unit data or an inertial navigation solution.

Example 16 includes the system of any of Examples 12-15, wherein the machine learning algorithm uses truth data to calculate the compensation model and the filter coefficients, wherein the truth data comprises data having greater accuracy than the inertial measurements and the one or more additional measurements, the truth data being at least one of: ground truth accelerations; angular rates; annotated raw and ground truth datasets for the one or more additional sensors; and publicly available datasets.

Example 17 includes the system of any of Examples 12-16, wherein the machine learning algorithm comprises a backpropagation algorithm.

Example 18 includes the system of any of Examples 12-17, wherein the compensation model comprises a series of compensation coefficients for the inertial measurements.

Example 19 includes the system of any of Examples 12-18, wherein training the machine learning algorithm to calculate the compensation model and the filter coefficients are performed during a same procedure.

Example 20 includes a system, comprising: an inertial measurement unit that produces inertial measurements for motion of a vehicle; one or more additional sensors that produce one or more additional measurements; a source of truth data; one or more memory units; and one or more processors configured to receive the inertial measurements, the one or more additional measurements, and the truth data, wherein the one or more processors are configured to: perform a fusion of the inertial measurements with the one or more additional measurements using a statistical filter; use the inertial measurements, the one or more additional measurements, and the truth data as inputs for a machine learning algorithm; calculate a compensation model for the inertial measurements and filter coefficients for the fusion of the inertial measurements with the one or more additional measurements with the machine learning algorithm using backpropagation; and store the compensation model and the filter coefficients on the one or more memory units for application of the compensation model to the inertial measurements and the filter coefficients to the fusion of the inertial measurements with the one or more additional measurements during operation of the vehicle.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method, comprising:
receiving inertial measurements from an inertial measurement unit (IMU);
receiving one or more additional measurements from one or more additional sensors;
providing the inertial measurements and the one or more additional measurements as inputs for a machine learning algorithm;
providing truth data as an additional input for the machine learning algorithm;
training the machine learning algorithm to calculate a compensation model for the inertial measurements and filter coefficients for fusing the inertial measurements with the one or more additional measurements; and
storing the compensation model and the filter coefficients for use during operation of a vehicle;
applying the compensation model to the inertial measurements and the filter coefficients to a fusion of the inertial measurements with the one or more additional measurements during operation of the vehicle to identify a navigation solution for the vehicle; and
guiding the vehicle using the navigation solution.

2. The method of claim 1, wherein the machine learning algorithm is at least one of a feedforward neural network and a recurrent neural network.

3. The method of claim 1, wherein fusing the inertial measurements with the one or more additional measurements comprises using a statistical filter to fuse the inertial measurements with the one or more additional measurements.

4. The method of claim 3, wherein the statistical filter is a differential filter.

5. The method of claim 3, wherein the filter coefficients describe combinations of the inertial measurements and the one or more additional measurements.

6. The method of claim 1, wherein the inertial measurements comprise at least one of a raw data sample from the IMU and an inertial navigation solution.

7. The method of claim 1, wherein the truth data comprises data having greater accuracy than the inertial measurements and the one or more additional measurements, the truth data being at least one of:
ground truth accelerations;
angular rates;
annotated raw and ground truth datasets for the one or more additional sensors; and
publicly available datasets.

8. The method of claim 1, wherein the machine learning algorithm includes a backpropagation algorithm.

9. The method of claim 1, wherein the compensation model comprises a series of compensation coefficients for the inertial measurements.

10. The method of claim 1, wherein the inertial measurements and the one or more additional measurements are provided as the inputs during at least one of:
an initial calibration period; and
a periodic calibration period.

11. The method of claim 1, wherein training the machine learning algorithm to calculate the compensation model and the filter coefficients are performed during a same procedure.

12. A system, comprising:
an inertial measurement unit that produces inertial measurements describing motion of a vehicle;
one or more additional sensors that produce one or more additional measurements;
one or more memory units; and
one or more processors configured to receive the inertial measurements and the one or more additional measurements, wherein the one or more processors are configured to:
compensate the inertial measurements with a compensation model stored on the one or more memory units; and
fuse the inertial measurements with the one or more additional measurements using a differential filter that applies filter coefficients stored on the one or more memory units to identify a navigation solution for the vehicle;
wherein the compensation model and the filter coefficients are stored on the one or more memory units as produced by execution of a machine learning algorithm;
guide the vehicle using the navigation solution.

13. The system of claim 12, wherein the machine learning algorithm is at least one of a feedforward neural network and a recurrent neural network.

14. The system of claim 12, wherein the filter coefficients of the differential filter are used to combine the inertial measurements and the one or more additional measurements.

15. The system of claim 12, wherein the inertial measurements comprise at least one of raw inertial measurement unit data or an inertial navigation solution.

16. The system of claim 12, wherein the machine learning algorithm uses truth data to calculate the compensation model and the filter coefficients, wherein the truth data comprises data having greater accuracy than the inertial measurements and the one or more additional measurements, the truth data being at least one of:
ground truth accelerations;
angular rates;
annotated raw and ground truth datasets for the one or more additional sensors; and
publicly available datasets.

17. The system of claim 12, wherein the machine learning algorithm comprises a backpropagation algorithm.

18. The system of claim 12, wherein the compensation model comprises a series of compensation coefficients for the inertial measurements.

19. The system of claim 12, wherein training the machine learning algorithm to calculate the compensation model and the filter coefficients are performed during a same procedure.

20. A system, comprising:
- an inertial measurement unit that produces inertial measurements for motion of a vehicle;
- one or more additional sensors that produce one or more additional measurements;
- a source of truth data;
- one or more memory units; and
- one or more processors configured to receive the inertial measurements, the one or more additional measurements, and the truth data, wherein the one or more processors are configured to:
  - perform a fusion of the inertial measurements with the one or more additional measurements using a statistical filter;
  - use the inertial measurements, the one or more additional measurements, and the truth data as inputs for a machine learning algorithm;
  - calculate a compensation model for the inertial measurements and filter coefficients for the fusion of the inertial measurements with the one or more additional measurements with the machine learning algorithm using backpropagation; and
  - store the compensation model and the filter coefficients on the one or more memory units for application of the compensation model to the inertial measurements and the filter coefficients to the fusion of the inertial measurements with the one or more additional measurements during operation of the vehicle to identify a navigation solution for the vehicle; and
  - guide the vehicle using the navigation solution.

* * * * *